United States Patent
Braun et al.

(10) Patent No.: US 10,526,478 B2
(45) Date of Patent: Jan. 7, 2020

(54) PROPYLENE COPOLYMER COMPOSITION

(71) Applicant: BOREALIS AG, Vienna (AT)

(72) Inventors: Hermann Braun, Linz (AT); Luca Boragno, Pichling (AT); Klaus Bernreitner, Linz (AT); Sanna Martin, Helsinki (FI); Tiina Suikkanen, Porvoo (FI); Wolfram Stadlbauer, Kefermarkt (AT)

(73) Assignee: BOREALIS AG, Vienna (AT)

( * ) Notice: Subject to any disclaimer, the term of this patent is extended or adjusted under 35 U.S.C. 154(b) by 76 days.

(21) Appl. No.: 15/576,757

(22) PCT Filed: May 13, 2016

(86) PCT No.: PCT/EP2016/060853
§ 371 (c)(1),
(2) Date: Nov. 24, 2017

(87) PCT Pub. No.: WO2016/192960
PCT Pub. Date: Dec. 8, 2016

(65) Prior Publication Data
US 2018/0298179 A1 Oct. 18, 2018

(30) Foreign Application Priority Data
May 29, 2015 (EP) ..................................... 15169897

(51) Int. Cl.
*C08L 23/14* (2006.01)

(52) U.S. Cl.
CPC ............ *C08L 23/14* (2013.01); *C08L 23/142* (2013.01); *C08L 2203/18* (2013.01); *C08L 2205/025* (2013.01); *C08L 2205/242* (2013.01)

(58) Field of Classification Search
CPC .. C08L 23/14; C08L 23/142; C08L 2205/025; C08L 2205/242; C08L 2203/18
See application file for complete search history.

(56) References Cited

U.S. PATENT DOCUMENTS

| | | | |
|---|---|---|---|
| 2004/0249004 A1* | 12/2004 | Coppini et al. | C08J 9/0061 521/56 |
| 2015/0259454 A1* | 9/2015 | Gahleitner et al. | C08F 210/06 526/348.6 |

FOREIGN PATENT DOCUMENTS

| | | |
|---|---|---|
| CN | 102822265 A | 12/2012 |
| EP | 491566 A2 | 6/1992 |
| EP | 586390 B1 | 5/1997 |
| EP | 591224 B1 | 2/1998 |
| EP | 0887379 A1 | 12/1998 |
| EP | 2067798 A1 | 6/2009 |
| EP | 2610270 A1 | 7/2013 |
| EP | 2610271 A1 | 7/2013 |
| EP | 2796498 A1 | 10/2014 |
| EP | 2796501 A1 | 10/2014 |
| KR | 20100032420 A | 3/2010 |
| KR | 10-2014-101457 A | 8/2014 |
| KR | 20140101457 A | 8/2014 |
| WO | 87/07620 A1 | 6/1987 |
| WO | 92/12182 A1 | 7/1992 |
| WO | 92/19653 A1 | 11/1992 |
| WO | 92/19658 A1 | 11/1992 |
| WO | 92/19659 A1 | 11/1992 |
| WO | 92/21705 A1 | 12/1992 |
| WO | 93/11166 A1 | 6/1993 |
| WO | 93/19100 A1 | 9/1993 |
| WO | 99/24478 A1 | 5/1999 |
| WO | 99/24479 A1 | 5/1999 |
| WO | 00/68315 A1 | 5/2000 |
| WO | 03/057341 A1 | 7/2003 |
| WO | 2004/000899 A1 | 12/2003 |
| WO | 2004/111095 A1 | 12/2004 |
| WO | 2009/007263 A1 | 1/2009 |
| WO | 2009/071471 A1 | 6/2009 |
| WO | 2014/075972 A1 | 5/2014 |

OTHER PUBLICATIONS

Office action for Korean Patent Application No. 10-2017703484, dated Oct. 16, 2018.
Zweifel, et al., "Plastics Additives Handbook", 5th Edition, Department of Materials, Institute of Polymers, 2001.
Jones, et al., "Crystalline Forms of Isotactic Polypropylene", Makromol Chem. 75, 1974, pp. 134-158.
Partial European Search Report for Application No. 15169897.4-1302, dated Aug. 25, 2015.
Office action for Chinese Patent Application No. 201680030243.7, dated Sep. 23, 2019.

* cited by examiner

*Primary Examiner* — Nathan M Nutter
(74) *Attorney, Agent, or Firm* — Tarolli, Sundheim, Covell & Tummino LLP

(57) ABSTRACT

A propylene copolymer composition which comprises —a random copolymer of propylene (A), —a random copolymer of propylene (B), and —optional additive(s), suitable for pressure pipe applications.

12 Claims, 1 Drawing Sheet

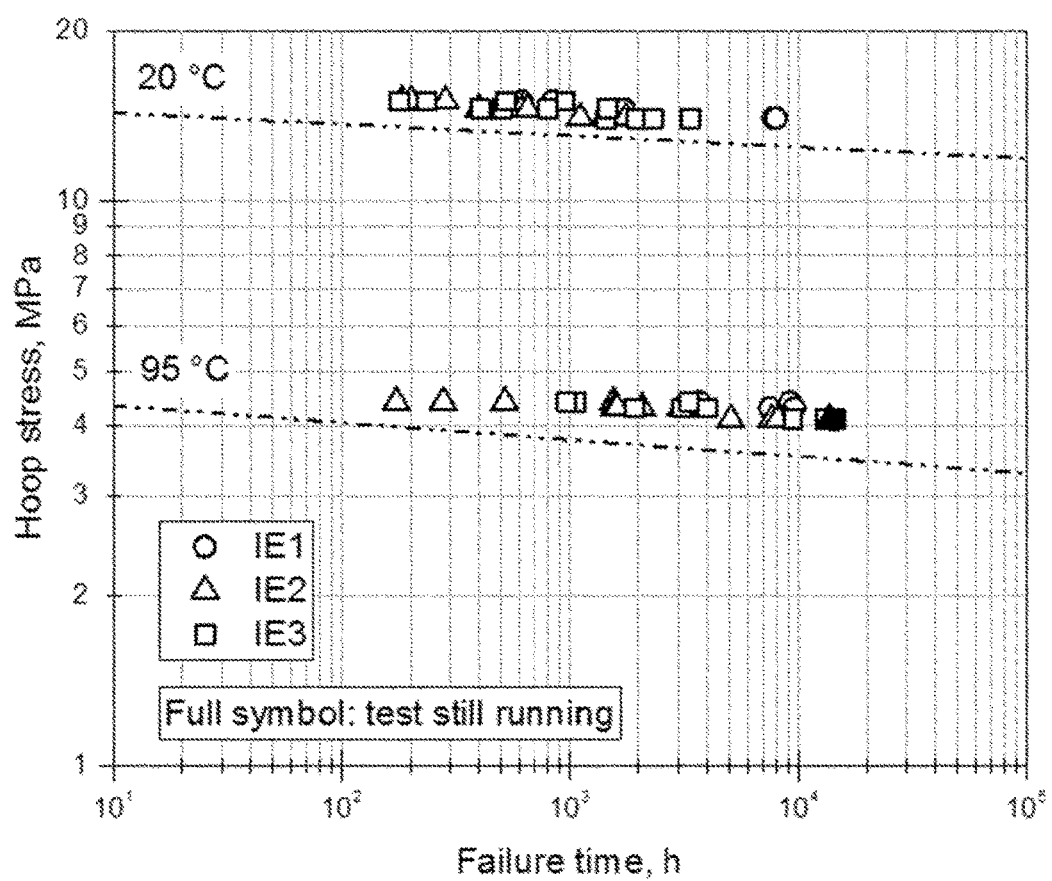

PROPYLENE COPOLYMER COMPOSITION

FIELD OF THE INVENTION

The present invention relates to new propylene copolymer compositions suitable for pipe applications and to articles comprising said propylene copolymer composition.

BACKGROUND ART

Random copolymers of propylene are especially suitable for pressure pipe applications for hot and cold water, as well as for industrial pipes, since the random copolymers have inter alia good creep resistance.

In such pressure pipe applications the pipe must also meet the requirements set for other mechanical properties like sufficient impact strength and pressure resistance. However, it is well known that increasing one of the impact and pressure resistance properties normally sacrifices the other.

Accordingly, for instance random copolymers of propylene can have limitations in certain pressure pipe applications.

EP2067798 of Borealis discloses a nucleated polypropylene composition for pipe, comprising green pigment. The polypropylene can be a homo propylene polymer, random propylene polymer or a heterophasic propylene polymer. The polypropylene polymer is not defined in details.

To meet the increasing demands in end use applications, there is a continuous need for further polypropylene copolymer compositions with an improved balance of impact and pressure resistance.

THE FIGURE

The FIGURE illustrates the pressure resistance of the pipe samples as regards to the reference lines defined in the standards ISO 15874-2 (2013, FIG. 4) for the pressure resistance certification.

DESCRIPTION OF THE INVENTION

Accordingly, the present invention is directed to a propylene copolymer composition selected from a polypropylene composition (a) comprising, preferably consisting of,
  a multimodal polypropylene (a) comprising, preferably consisting of,
  (A) a random copolymer of propylene having an $MFR_2$ of 0.01 to 0.5 g/10 min (ISO 1133, 2.16 kg load, 230° C.),
    one or more comonomer(s) selected from ethylene or C4-C10 alpha olefins and having a comonomer content of 5.5 to 9 mol %;
  (B) a random copolymer of propylene having an $MFR_2$ of 0.1 to 15 g/10 min (ISO 1133, 2.16 kg load, 230° C.),
    one or more comonomer selected from ethylene or C4-C10 alpha olefins;
  wherein the random copolymer of propylene (A) has a lower $MFR_2$ and higher comonomer content than the random copolymer of propylene (B);
  (C) optional β-nucleating agent; and
  (E) optional further additives other than the optional β-nucleating agent (C);
wherein the propylene copolymer composition has an $MFR_2$ of 0.15 to 0.30 g/10 min and a comonomer content of 2.8 to 9.9 mol %; or a polypropylene composition (b) comprising, preferably consisting of,
  a multimodal polypropylene (b) comprising, preferably consisting of,
  (A) a random copolymer of propylene,
  (B) a random copolymer of propylene; wherein the random copolymer of propylene (A) has a lower $MFR_2$ and higher comonomer content than the random copolymer of propylene (B);
  (C) β-nucleating agent; and
  (E) optional further additives other than the β-nucleating agent (C);
wherein the propylene copolymer composition has an MFR2 of 0.15 to 0.30 g/10 min and a comonomer content of 2.8 to 9.9 mol %; and
wherein the propylene copolymer composition is at least partially crystallized in the β-modification by said β-nucleating agent and has B>0.6, wherein the B is defined as described below under Determination methods.

"Propylene copolymer composition" is referred herein also as "composition of the invention". "Polypropylene composition (a)" is referred herein also as "PP composition (a)". "Polypropylene composition (b)" is referred herein also as "PP composition (b)". "Random copolymer of propylene (A)" is referred herein also as "component (A)".

"Random copolymer of propylene (B)" is referred herein also as "component (B)".

The composition of the invention is multimodal with respect to propylene copolymer components. "Multimodal" means herein that the propylene polymer present in the composition of the invention has at least two polymer components which are different at least with respect to 1) MFR and 2) comonomer content.

It has been surprisingly found that the combination of random copolymer of propylene (A) and random copolymer of propylene (B), wherein the random copolymer of propylene (A) has a lower $MFR_2$ and higher comonomer content than random copolymer of propylene (B), as defined above, below or in claims, results in improved impact strength-pressure resistance balance of the final propylene copolymer composition, i.e. for instance the notched impact strength (at 0° C.) is improved while maintaining the good pressure resistance property.

The improved impact property is expressed herein as notched impact strength as defined under the Determination Methods and the pressure resistance is expressed as the equation as defined below and under the Determination Methods to describe the hoop stress curve. The pressure resistance is also illustrated in the FIGURE.

The present invention is also directed to an article comprising, preferably consisting of, the composition of the invention. The article is preferably a pipe or pipe fitting, preferably a pipe or fitting for pressure pipe applications, more preferably a pressure pipe or pipe fitting for hot and cold water pipe applications, most preferably a pressure pipe for hot and cold water pipe applications.

Pressure pipe for hot and cold water applications has a well-known meaning in the field of polypropylene pipe applications and implies for a skilled person generally accepted property requirements for the pipe to be usable in such applications.

A random copolymer of propylene denotes a copolymer of propylene monomer units and comonomer units in which the comonomer units are randomly distributed in the polymeric chain. Thereby, a random copolymer of propylene includes a fraction, which is insoluble in xylene, i.e. xylene cold insoluble (XCU) fraction, in an amount of at least 80 wt %, still more preferably of at least 85 wt % and most preferably of at least 90 wt %, based on the total amount of the random copolymer of propylene.

As known for skilled person, random copolymer is different from heterophasic polypropylene. Generally, a heterophasic polypropylene is a propylene copolymer comprising a propylene homo or random copolymer matrix component (1) and an elastomeric copolymer component (2) of propylene with one or more of ethylene and C4-C8 olefin comonomers, wherein the elastomeric (amorphous) copolymer component (2) is dispersed in said propylene homo or random copolymer matrix polymer (1). The presence of elastomeric phase or the so called inclusions are for instance visible by high resolution microscopy, like electron microscopy or atomic force microscopy. The random copolymer does not contain an elastomeric polymer phase dispersed therein.

The composition of the invention, the components (A) and (B) of the invention and the article of the invention are described below with further details, preferred embodiments, ranges and properties, which preferred embodiments, ranges and properties can be combined in any order.

Random Copolymer of Propylene (A)

The one or more, preferably one, comonomer(s) of said component (A) are preferably selected from C2 and C4 to C6 alpha-olefins. A particular preferred comonomer is ethylene.

The comonomer content of the component (A) is preferably 5.8 to 7.3, more preferably 5.9 to 6.6, mol %, when defined as described below under Determination methods.

The component (A) has preferably $MFR_2$ of 0.02 to 0.1, more preferably 0.04 to 0.08, g/10 min, when defined as described below under Determination methods.

Random Copolymer of Propylene (B)

The one or more, preferably one, comonomer(s) of said component (B) are preferably selected from C2 and C4 to C6 alpha-olefins. A particular preferred comonomer is ethylene.

The comonomer content of the component (B) is preferably of 1.5 to 11, preferably 1.9 to 7.0, more preferably 2.2 to 5.2, mol %, when defined as described below under Determination methods.

The component (B) has preferably $MFR_2$ of 0.3 to 10, more preferably 0.5 to 7.0, more preferably 3.0 to 7.0, g/10 min, when defined as described below under Determination methods.

As well known, in case $MFR_2$ of one of the component (A) or component (B) cannot be measured, then it can be calculated using the below formula:

$$\ln(MFR_2 \text{ of the } PP \text{ composition})=x(\ln(MFR_2 \text{ of component}(A)))+(1-x)(\ln(MFR_2 \text{ of component}(B)));$$

wherein $MFR_2$ of the PP composition means $MFR_2$ of the PP composition (a) or, respectively, PP composition (b); x=the weight ratio (wt) of component (A) based on the combined weight of the component (A) and component (B) (=1).

In case the comonomer content of one of the component (A) or component (B) cannot be measured, then it can be calculated based on the same principles as given above for the MFR.

Preparation of the Random Copolymer of Propylene (A) and Random Copolymer of Propylene (B)

The random copolymer of propylene (A) and random copolymer of propylene (B) can be produced separately and then blended together mechanically. Mechanical blending is well known in the art.

It is preferred that random copolymer of propylene (A) and random copolymer of propylene (B) are produced in situ in a multistage polymerisation process, preferably a continuous multistage process, in a conventional manner.

It is to be understood that as soon as the inventors had found the advantageous property balance resulting to the polypropylene composition, then for industrial scale production it is within the skills of a skilled person to adjust process parameters and controls to obtain the properties of the polypropylene composition. The process for producing components (A) and (B) preferably comprises at least two polymerisation stages.

The components (A) and (B) can be produced in any suitable multistage polymerization process known in the art. The component (A) is preferably produced in a first polymerization zone and the component (B) is produced in a second polymerization zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations.

The component (A) and component (B) are preferably produced in a sequential polymerization process in slurry reactor(s), preferably loop reactor(s), and/or in subsequent gas phase reactor(s).

As a consequence, each component prepared in a specific reactor will have its own molecular weight distribution, MFR and/or comonomer content distribution.

In case of propylene polymerisation for slurry reactor(s), preferably loop reactor(s), the reaction temperature will generally be in the range 60 to 110° C., e.g. 60 to 85° C., the reactor pressure will generally be in the range 5 to 80 bar, e.g. 20 to 60 bar, and the residence time will generally be in the range 0.1 to 5 hours, e.g. 0.3 to 2 hours. The monomer is usually used as reaction medium.

For gas phase reactor(s), the reaction temperature used will generally be in the range 60 to 115° C., e.g. 70 to 110° C., the reactor pressure will generally be in the range 10 to 25 bar, and the residence time will generally be 0.5 to 8 hours, e.g. 0.5 to 4 hours. The gas used will be the monomer optionally as mixture with a non-reactive gas such as nitrogen or propane.

In addition to actual polymerisation steps and reactors, the process can contain any additional polymerisation steps, like prepolymerisation step, and any further after reactor handling steps as known in the art. The prepolymerization reaction is typically conducted at a temperature of 0 to 60° C., preferably from 10 to 50° C.

The pressure in the prepolymerization reactor is not critical but must be sufficiently high to maintain the reaction mixture in liquid phase. Thus, the pressure may be from 20 to 100 bar, for example 30 to 70 bar.

The optional prepolymer fraction is calculated to the amount of that component, e.g. component (A), which is polymerised in the subsequent step after the prepolymerisation step.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

Another equally preferable multistage process is a "loop-loop" process known as the Spheripol® process of LyondellBasell.

The component (A) and component (B) of the invention are preferably produced by polymerization using any suitable Ziegler-Natta type. Typical suitable Ziegler-Natta type catalyst is stereospecific, solid high yield Ziegler-Natta catalyst component comprising as essential components Mg, Ti and Cl. In addition to the solid catalyst a cocatalyst(s) as well external donor(s) are typically used in polymerisation process.

Components of catalyst may be supported on a particulate support, such as inorganic oxide, like silica or alumina, or, usually, the magnesium halide may form the solid support. It is also possible that catalysts components are not supported on an external support, but catalyst is prepared by emulsion-solidification method or by precipitation method.

The solid catalyst usually also comprises an electron donor (internal electron donor) and optionally aluminium. Suitable internal electron donors are, among others, esters of carboxylic acids or dicarboxylic acids, like phthalates, maleates, benzoates, citraconates, and succinates, 1,3-diethers or oxygen or nitrogen containing silicon compounds. In addition mixtures of donors can be used.

The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Suitable external electron donors used in polymerisation are well known in the art and include ethers, ketones, amines, alcohols, phenols, phosphines and silanes. Silane type external donors are typically organosilane compounds containing Si—OCOR, Si—OR, or Si—NR$_2$ bonds, having silicon as the central atom, and R is an alkyl, alkenyl, aryl, arylalkyl or cycloalkyl with 1-20 carbon atoms are known in the art.

It is most preferred to use silanes of the general formula $R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, Further, silanes of general formula $Si(OCH_2CH_3)_3(NR^3R^4)$ wherein $R^3$ and $R^4$ can be the same or different a represent a linear, branched or cyclic hydrocarbon group having 1 to 12 carbon atoms, can be used.

Preferably $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl.

In addition to the Ziegler-Natta catalyst and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen for each process.

Examples of suitable catalysts used in the present invention and preparation methods thereof are disclosed in among others, in WO 87/07620, WO 92/21705, WO 93/11166, WO 93/19100, EP491566, WO 92/19659, WO 92/19653, WO 92/19658, WO03/057341, EP2610270 and EP 2610271.

It is preferred that components (A) and (B) are polymerized using the same catalyst.

After the mixture of component (A) and component (B) has been removed from the last polymerisation stage, it is preferably subjected to process steps for removing the residual hydrocarbons from the polymer. Such processes are well known in the art and can include pressure reduction steps, purging steps, stripping steps, extraction steps and so on. Also combinations of different steps are possible. After the removal of residual hydrocarbons the mixture of component (A) and component (B) is preferably mixed with additives as it is well known in the art. Such additives are described below under the polymer composition of the invention. The polymer particles are then typically extruded to pellets as it is known in the art. Preferably co-rotating twin screw extruder is used for the extrusion step. Such extruders are manufactured, for instance, by Coperion (Werner & Pfleiderer) and Japan Steel Works.

Propylene Copolymer Composition

The propylene copolymer composition is preferably selected from
  a polypropylene composition (a) which optionally comprises the (C) β-nucleating agent.

In a preferred embodiment, the polymer composition is the polypropylene composition (a) and comprises the (C) β-nucleating agent. In this preferred embodiment of the polypropylene composition (a) and in case of the polypropylene composition (b), one or both, preferably both of the components (A) and (B) are at least partially crystallized in the β-modification by said β-nucleating agent. The β-nucleating agent preferably contributes further to the improved impact-stress resistance balance. β-nucleating agents (C) are typically commercially available β-nucleating agent products (as supplied by the supplier). β-nucleating agent products can be added as such or e.g. in form of well-known master batch together with a carrier medium, like carrier polymer.

β-nucleating agents (C) have a well-known meaning in the field and are different from so called α-nucleating agents, like polyvinyl cyclohexane derivatives, which can be added to a polymer composition to cause α-modification of the propylene polymer, as well-known in the art. The α-nucleating agent is preferably not present in the polypropylene composition (a). The α-nucleating agent is preferably not present in the polypropylene composition (b).

The polymer composition, preferably the PP composition (a), has preferably B of at least 0.6, preferably of at least 0.7, preferably of at least 0.75, more preferably of at least 0.80, when defined as described below under "Determination methods".

The composition of the invention, preferably the PP composition (a), preferably comprises, based on the combined amount of the component (A) and the component (B), 45 to 65 wt %, preferably 50 to 65 wt %, preferably 55 to 65, wt % of the random copolymer of propylene (A).

35 to 55 wt % preferably 35 to 50, preferably 35 to 45, wt % of the random copolymer of propylene (B).

The polymer composition, preferably the PP composition (a), has preferably a Notched Charpy impact of >1 kJ/m², preferably at least 2, more preferably at least 4, more preferably 4 to 20, kJ/m², when measured at 0° C. according to ISO 179 as described below under Determination methods.

The polymer composition, preferably the PP composition (a), has preferably comonomer content of 3.4 to 8.3 mol %, more preferably 4.4 to 6.0, mol %.

The polymer composition, preferably the PP composition (a), has highly advantageous pressure resistance expressed as failure time vs. hoop stress relation according to ISO 15874-2 (2013), FIG. 4. The highly advantageous pressure resistance is shown later below under the experimental part (the ductile failure point of the composition of the invention is above reference lines as given in FIG. 4).

Suitable types of β-nucleating agents (C) are dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, e.g.

N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N'-di-$C_5$-$C_8$-cycloalkyl-4,4-biphenyldicarboxamide compounds such as N,N'-dicyclohexyl-4,4-biphenyldicarboxamide and N,N'-dicyclopentyl-4,4-biphenyldicarboxamide, N.N'-di-$C_5$-$C_8$-cycloalkyl-terephthalamide compounds such as N.N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, e.g.

N.N'—$C_6$-$C_{12}$-arylene-bis-benzamide compounds such as N,N'-p-phenylene-bis-benzamide and N,N'-1,5-naphthalene-bis-benzamide, N.N'—$C_5$-$C_8$-cycloalkyl-bis-benzamide compounds such as N,N'-1,4-cyclopentane-bis-benzamide and N,N'-1,4-cyclohexane-bis-benzamide, N.N'-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and N.N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.

N-phenyl-5-(N-benzoylamino)pentaneamide and N-cyclohexyl-4-(N-cyclohexyl-carbonylamino)benzamide.

Further suitable β-nucleating agents (C) are quinacridone type compounds, e.g.

quinacridone, dimethylquinacridone and dimethoxyquinacridone, quinacridonequinone type compounds, e.g.

quinacridonequinone, a mixed crystal of 5,12-dihydro(2,3b)acridine-7,14-dione with quino(2,3b)acridine-6,7,13,14-(5H,12H)-tetrone and dimethoxyquinacridonequinone and dihydroquinacridone type compounds, e.g.

dihydroquinacridone, dimethoxydihydroquinacridone and dibenzodihydroquinacridone.

Still further suitable β-nucleating agents (C) are salts of dicarboxylic acids with metals of group II of the periodic table, particularly salts of dicarboxylic acids with at least 7 carbon atoms with metals from group II of the periodic table, e.g. pimelic acid calcium salt and suberic acid calcium salt; and mixtures of dicarboxylic acids and salts of metals from group IIa of periodic system.

Still further suitable β-nucleating agents (C) are salts of metals from group IIa of periodic system and imido acids of the formula

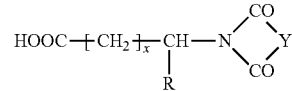

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e.g.

calcium salts of phthaloylglycine, hexahydrophthaloylglycine, N-phthaloylalanine and/or N-4-methylphthaloylglycine.

Especially suitable β-nucleating agents (C) are any one or mixtures of N,N'-dicyclohexyl-2,6-naphtalene dicarboxamide, the β-nucleating agents of EP 177961 and those of EP 682066, the disclosure of which patent publications is incorporated herein by reference.

Particularly preferred ß-nucleating agents (C) are N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

The amount of the β-nucleating agent (C) product (as commercially available) may be employed in amounts of from 0.0001 to 2.0 wt %, preferably 0.001 to 1.0 wt %, more preferably 0.003 to 0.3 wt % and most preferably 0.003 to 0.25 wt %, based on the weight of the final propylene copolymer composition. Preferred β-nucleating agents (C) selected from quinacridone pigments illustrated above preferably are used in amounts of 0.001 to 0.01 wt %, such as 0.002 to 0.006 wt %, while other preferred β-nucleating agents (C) selected among the Group II metal salts of dibasic carboxylic acids, such as pimelic acid calcium salt and suberic acid calcium salt are preferably employed in amounts of 0.05 to 0.3 wt %, such as 0.2 wt %.

The composition of the invention, preferably the PP composition (a) may optionally comprise a color pigment as a further additive (D). The term "pigment" has a well-known meaning. Pigments (D) are typically commercially available pigment products (as supplied by the supplier). Pigments products (D) can be added as such or e.g. in the form of master batch together with a carrier medium, like carrier polymer.

As an example of pigments products (D) for pipe applications is green. The colour green is achieved by the use of specific inorganic pigments, especially the pigments C.I. Pigment Green 17, C.I. Pigment Green 26 and C.I. Pigment Green 50 (c.f. Plastics Additives Handbook, $5^{th}$ Edition, Edited by Dr. Hans Zweifel, Carl Hanser Verlag, Munich 2001, p. 849).

Chemically, C.I. Pigment Green 17 is $Cr_2O_3$. It is also identified by CAS No. 68909-79-5.

Chemically, C.I. Pigment Green 26 is $CoCr_2O_4$. It is also identified by CAS No. 68187-49-5.

Chemically, C.I. Pigment Green 50 is $(Co,Ni,Zn)_2TiO_4$. It is also identified by CAS No. 68186-85-6.

The amount of the optional pigment (D) product (as commercially available) is 0.002 to 0.01, preferably 0.030 to 0.0090, more preferably 0.0035 to 0.0080 wt %.

The preferable β-nucleating agent (C) and the optional pigment product (D) can be added to one or both of the components (A) and (B), preferably to the mixture of the components (A) and (B), by meltmixing to cause the β-modification and, respectively, coloring effect. The preferable β-nucleating agent (C) and the optional pigment product (D) can be added as such or in the form of masterbatch together with a carrier medium, such as carrier polymer. The preferable β-nucleating agent (C) and the optional pigment product (D) can be added separately. Alternatively preferable β-nucleating agent (C) and the optional pigment product (D) can be added e.g. in the same master batch. Meltmixing is typically effected at temperature of 175 to 250° C. Example of addition methods are mentioned e.g. WO2009071471.

The composition of the invention, preferably the PP composition (a), may comprise further polymer components that are different from the component (A) and component (B). Most preferably the composition of the invention consists of the component (A) and the component (B) as the polymer components. "Polymer components" excludes herein any optional carrier polymers of optional master batches for β-nucleating agent (C), pigment (D) and/or further additive(s) (E) products. Such optional carrier polymers are calculated to the amount of the respective additive product, based on the amount (100%) of the composition of the invention.

The polymer composition of the invention comprises preferably further additive(s) (D) which are other than said pigment (D). Such further additives (D) are preferably conventional additives for pipe applications, including without limiting to, clarifiers, brighteners, acid scavengers and antioxidants, as well as slip agents, further fillers and UV light stabilizers. Each additive can be used e.g. in conventional amounts, the total amount of additives present in the propylene composition being preferably as defined above. Such additives are generally commercially available and are described, for example, in "Plastic Additives Handbook", 5th edition, 2001 of Hans Zweifel. The total amount of optional additives (D) is preferably between 0.0001 and 5.0 wt %, preferably 0.0001 and 2.5 wt %.

As mentioned the composition of the invention has an excellent balance between impact strength and pressure resistance properties. Namely, the composition of the invention has e.g. enhanced impact strength and highly advantageous pressure resistance.

Article

The article of the invention comprising the composition of the invention, preferably the PP composition (a), is preferably selected from an extruded article, preferably a pipe, or a moulded article, preferably an injection moulded or blow moulded article which is preferably a fitting used in pipe applications.

The pipe and fitting produced from the composition according to the invention preferably have good mechanical properties as described above and shown below in experimental part. Thus, the pipe according to the invention preferably qualifies as pressure pipe, more preferably is a pressure pipe for hot and cold water applications.

Pipe of the invention can be
a monolayer pipe, wherein the pipe layer comprises, preferably consists of, the composition of the invention, or
    a multilayer pipe, wherein at least one layer comprises, preferably consists of, the composition of the invention.

The preferred pipe of the invention has at least one layer, preferably one layer, comprising, preferably consisting of, the composition of the invention. Preferred pipe is a pressure pipe, more preferably a pressure pipe for hot and cold water applications.

Fitting of the invention preferably consists of the composition of the invention.

Production of the Pipe of the Invention:

The invention further provides a process for producing a pipe comprising the steps of:
    mixing the propylene copolymer composition comprising the random copolymer of propylene (A), the random copolymer of propylene (B) and the further components using mechanical mixing means, preferably an extruder, and
    extruding the obtained meltmix of the polymer to a form of a pipe.

Pipes can be produced from the composition of the present invention according to the methods known in the art. Thus, according to one preferred method the composition of the invention is extruded through an annular die to a desired internal diameter, after which the composition of the invention is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35. The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 metres or more.

Production of Fittings of the Invention:

Fittings of the invention can be produced from the composition of the invention using the methods and equipment known in the art. Preferably, the fittings of the invention is moulded, preferably injection moulded or blown moulded, more preferably injection moulded, in a conventional manner using conventional moulding equipment, to a shape of a fitting for a pipe.

Determination Methods

Melt Flow Rate:

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is measured at a temperature 230° C. and a load of 2.16 kg.

Density:

ISO 1183, measured on compression moulded plaques

Comonomer Content:

The comonomer content was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 micrometer and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Specifically, the butene or hexene content of a polypropylene copolymer is determined using the baseline corrected peak area of the quantitative bands found at 1377-1379 $cm^{-1}$. Quantitative results are obtained based upon reference to the film thickness.

The comonomer content is herein assumed to follow the mixing rule (equation 2):

$$C_b = w_1 \cdot C_1 + w_2 \cdot C_2 \qquad (eq.\ 2)$$

Where C is the content of comonomer in weight-%, w is the weight fraction of the component in the mixture and subscripts b, 1 and 2 refer to the overall mixture, component 1 and component 2, respectively.

As it is well known to the person skilled in the art the comonomer content in weight basis in a binary copolymer can be converted to the comonomer content in mole basis by using the following equation $$c_m = \frac{1}{1 + \left(\frac{1}{c_w} - 1\right) \cdot \frac{MW_c}{MW_m}} \qquad (eq.\ 3)$$

where $c_m$ is the mole fraction of comonomer units in the copolymer, $c_w$ is the weight fraction of comonomer units in the copolymer, $MW_c$ is the molecular weight of the comonomer (such as ethylene) and $MW_m$ is the molecular weight of the main monomer (i.e., propylene).

Xylene Cold Soluble (XCS):

The amount of xylene cold soluble fraction was determined according to ISO 16152. The amount of polymer which remains dissolved at 25° C. after cooling is given as the amount of xylene soluble polymer.

The content of xylene soluble polymer is herein assumed to follow the mixing rule (equation 4):

$$XS_b = w_1 \cdot XS_1 + w_2 \cdot XS_2 \qquad (eq.\ 4)$$

Where XCS is the content of xylene soluble polymer in weight-%, w is the weight fraction of the component in the mixture and subscripts b, 1 and 2 refer to the overall mixture, component 1 and component 2, respectively.

Charpy Impact Strength Notched:

NIS was determined according to ISO 179-1:2000 on V-notched samples of 80×10×4 $mm^3$ at 23° C., 0° C., −10° C. or −20° C., as specified in the experimental part.

The test specimens were prepared by injection moulding using an IM ENGEL 310/55 1158 machinery in line with EN ISO 1873-2 (80*10×4 $mm^3$). The melt temperature was 255° C. and the mould temperature was 40° C.

The pipe impact tests (un-notched) were performed on specimen milled from pipes according to ISO 9854— Part I and II: 1994.

Pressure resistance is expressed as failure time vs. hoop stress relation according to ISO 15874-2 (2013), FIG. 4.

Determination of the β-Modification (B) in the Polymer Composition:

Wide-angle X-ray Scattering (WAXS): Samples prepared for WAXS were prepared in the same way as for the puncture energy measurement. The determination of crystallinity and of polymorphic composition was performed in reflection geometry using a Bruker D8 Discover with GADDS x-ray diffractometer operating with the following settings: x-ray generator: 30 kV and 20 mA; 01=6° & 02=13°; sample-detector distance: 20 cm; beam size (collimator): 500 μm; and duration/scan: 300 seconds. 3 measurements have been performed on each sample. Intensity vs. 2θ curves between 2θ=10° and 2θ=32.5° were obtained by integrating the 2-dimensional spectra. The quantification of intensity vs. 2θ curves were then performed as follows:

Intensity vs. 2θ curve was acquired with the same measurement settings on an amorphous iPP sample, which was prepared by solvent extraction. An amorphous halo was obtained by smoothing the intensity vs. 2θ curve. The amorphous halo has been subtracted from each intensity vs. 2θ curve obtained on actual samples and this results in the crystalline curve.

In a two-phase crystalline system (containing α- and β-modifications), the amount of β-modification within the crystalline phase B was calculated using the method proposed by Turner-Jones et al. (Makromol. Chem. Vol. 75 (1964), pages 134-158) as:

$$B = \frac{I^\beta(300)}{I^\alpha(110) + I^\alpha(040) + I^\alpha(130) + I^\beta(300)}$$

where, Iβ(300) is the intensity of β(300) peak, Iα(110) is the intensity of α(110) peak, Iα(040) is the intensity of α(040) peak and Iα(130) is the intensity of α(130) peak obtained after subtracting the amorphous halo.

EXPERIMENTAL PART

Catalyst Preparation:

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491 566, EP 591 224 and EP 586 390.

Then triethylaluminium (TEAL), dicyclopentyldimethoxysilane (DCPDMS) as donor (Do), catalyst as produced above and vinylcyclohexane (VCH) were added into oil, like mineral oil, e.g. Technol 68 (kinematic viscosity at 40° C. 62-74 cSt), in amounts so that Al/Ti was 3-4 mol/mol, Al/Do was as well 3-4 mol/mol, and weight ratio of VCH/solid catalyst was 1:1. The mixture was heated to 60-65° C. and allowed to react until the content of the unreacted vinylcyclohexane in the reaction mixture was less than 1000 ppm. Catalyst concentration in the final oil-catalyst slurry was 10-20 wt-%.

Polymerisation of Random Polymer of Propylene (A) Component and Random Polymer of Propylene (B) Component:

Polymerisation of Inventive Components (A) and (B) of Inventive Example IE1:

Component (A): A stirred tank reactor having a volume of 45 dm3 was operated as liquid-filled at a temperature of 28° C. and a pressure of 51 bar. Into the reactor was fed propylene so much that the average residence time in the reactor was 0.3 hours together with 2.0 g/h hydrogen and polymerization catalyst prepared according to Catalyst Preparation Example above with triethyl aluminium (TEA) as a cocatalyst and dicyclopentyldimethoxysilane (DCPDMS) as external donor so that the molar ratio of TEA/Ti was about 470 and TEA/DCPDMS was 6 (mol/mol). The slurry from this prepolymerization reactor was directed to a loop reactor having a volume of 150 dm3 together with 150 kg/h of propylene. The loop reactor was operated at a temperature of 68° C. and a pressure of 50 bar. The ratio of hydrogen to propylene was 1.0 mol/kmol. Ethylene was introduced into the reactor to obtain the content of 6.2 mol % of ethylene comonomer in the component (A). The production rate of propylene copolymer was 30 kg/h.

Component (B): The polymer slurry from the loop reactor was directly conducted into a second loop reactor having a volume of 150 dm3 together with 150 kg/h of propylene. The loop reactor was operated at a temperature of 68° C. and a pressure of 49 bar. The ratio of hydrogen to propylene was 1.0 mol/kmol. Ethylene was introduced into the reactor to obtain the content of 2.5 mol % (calculated) of ethylene comonomer in the component (B). The production rate of propylene copolymer was about 30 kg/h.

The polymerization of components (A) and (B) of the inventive examples IE2 and IE3 and of the components (A) and (B) of the comparatives examples (CE1-CE4) were produced with the same reactor setup and as (IE) and using the same catalyst, except that the conditions were adjusted to get the desired final MFR2 and total ethylene comonomer content of the final polymer (mixture of components (A) and (B)). The final polymer properties and process conditions are listed in Table 1.

Compounding of the Inventive and Comparative Propylene Compositions:

The obtained mixture of component (A) and component (B) of inventive and comparative examples were compounded using same amounts of conventional β-nucleating agent (0.003 wt % of Cinquaisa gold: Quino(2,3-b)acridine-6,7,13,14(5H,12H)-tetrone, CAS 1503-48-6, supplier BASF), conventional antioxidants and Ca-stearate and pelletized in a W&P ZSK 70 twin-screw extruder (Coperion) at a melt temperature of 240° C. and an extruder throughput of 200 kg/h. The compounded final mixtures are referred in table 2 as inventive polymer compositions IE1 to 1E3 and, respectively, comparative polymer compositions CE1 to CE2. And in the FIGURE inventive polymer compositions IE1 to 1E3 are referred shortly as IE1, IE2 and IE3.

TABLE 1

Preparation of the inventive compositions (IE1-IE3) and comparative compositions (CE1-CE4)

|  |  | IE1 | IE2 | IE3 | CE1 | CE2 | CE3 | CE4 |
| --- | --- | --- | --- | --- | --- | --- | --- | --- |
| TEAL/Donor | [mol/mol] | 6 | 6 | 6 | 5.4 |  | 5.9 | 6 |
| 1$^{st}$ Loop (component (A)) |  |  |  |  |  |  |  |  |
| Temperature | ° C. | 68 | 68 | 68 | 68 |  | 66 | 66 |
| Pressure | bar | 50 | 50 | 50 | 50 |  | 49 | 49 |
| MFR2 | g/10 min | 0.06 | 0.06 | 0.06 | 0.06 | 0.06 | 0.06 | 0.06 |
| C2 content in component (A) | mol % | 6.2 | 6.2 | 6.2 | 5.0 | 5.0 | 5.0 | 5.0 |
| 2$^{st}$ Loop (component (B)) |  |  |  |  |  |  |  |  |
| Temperature | ° C. | 68 | 68 | 68 | 68 |  | 68 | 68 |
| Pressure | bar | 49 | 49 | 49 | 49 |  | 49 | 49 |
| Production Split (wt %), 1$^{st}$ Loop/2$^{nd}$ loop |  | 63/37 | 60/40 | 60/40 | 58/42 |  | 59/41 | 58/42 |
| Ethylene feed split (wt %), 1$^{st}$ Loop/2$^{nd}$ loop |  | 76/24 | 74/26 | 74/26 | 66/34 |  | 66/34 | 66/34 |
| C2 (calc) content in component (B) | mol % | 2.5 | 4.4 | 3.7 | 4.8 |  | 4.4 | 4.1 |
| MFR2 (calc) | g/10 min | 6.3 | 4.9 | 4.9 | 4.8 |  | 4.5 | 5.4 |

TABLE 1-continued

Preparation of the inventive compositions (IE1-IE3) and comparative compositions (CE1-CE4)

|  |  | IE1 | IE2 | IE3 | CE1 | CE2 | CE3 | CE4 |
|---|---|---|---|---|---|---|---|---|
| Final polymer (mixture of components (A) and (B)) | | | | | | | | |
| MFR (230° C., 2.16 kg) | g/10 min | 0.2 | 0.2 | 0.2 | 0.3 | 0.3 | 0.2 | 0.4 |
| Total C2 content | mol % | 4.9 | 5.4 | 5.2 | 5.0 | | 4.9 | 4.7 |
| Total C2 content | wt % | 3.3 | 3.7 | 3.5 | 3.4 | | 3.3 | 3.2 |
| Beta content (B) | | 0.83 | 0.83 | 0.82 | 0.80 | 0.82 | 0.82 | 0.81 |

Pipe Tests:

Test Pipe Preparation:

The polymers of inventive and comparative examples were extruded to pipes by using a Battenfeld Pro R1349 pipe extruder. Temperature profile: Inlet 52° C. Cylinder zones 1-4 205° C., 210° C., 215° C., 220° C.: Head: all zones 220° C. The pipes had a diameter of 32 mm and wall thickness of 3 mm for the pressure resistance evaluation.

Temperature profile: Inlet 58° C. Cylinder zones 1-4 210° C., 215° C., 220° C., 225° C.: Head: all zones 220° C. The pipes had diameter of 32 mm and wall thickness of 4.4 mm for the evaluation of the Un-notched Charpy pipe impact.

TABLE 2

Characterization of inventive polymer compositions (IE1-IE3) and comparative polymer compositions (CE1-CE4)

| test results | | Inventive and comparative polymer compositions | | | | | | |
|---|---|---|---|---|---|---|---|---|
| | | IE1 | IE2 | IE3 | CE1 | CE2 | CE3 | CE4 |
| MFR (230° C., 2.16 kg) | g/10 min | 0.2 | 0.2 | 0.2 | 0.3 | 0.3 | 0.2 | 0.4 |
| XCS | wt % | 5 | 5 | 5 | 4 | 4 | 4 | 4 |
| NOTCHED CHARPY IMPACT STRENGTH at 0° C. (ISO179-1:2000 using the injection moulded specimen | kJ/m² | 6.3 | 11.2 | 7.5 | 2.8 | 2.0 | 3.4 | 3.4 |
| Un-notched Charpy Impact using pipe sample (ISO 9854-Part I and II:1994) (Number of partial or complete breaks) | | 0 | 0 | 0 | 8C | 10C | 5C 3P | 4C 2P |

As can be seen from results, the inventive compositions has improved Charpy properties while keeping good pressure resistance compared to comparative examples CE1 to CE4.

The FIGURE shows that the pipes of the polymer composition of the invention meet the pressure resistance requirements.

The invention claimed is:

1. A propylene copolymer composition comprising: a polypropylene composition (a) comprising a multimodal polypropylene (a) comprising:
   (A) a random copolymer of propylene having:
      an MFR$_2$ of 0.01 to 0.5 g/10 min (ISO 1133, 2.16 kg load, 230° C.),
      one or more comonomer(s) selected from ethylene or C4-C10 alpha olefins and having a comonomer content of 5.8 to 7.3 mol %;
   (B) a random copolymer of propylene having:
      an MFR$_2$ of 0.1 to 15 g/10 min (ISO 1133, 2.16 kg load, 230° C.),
      one or more comonomer selected from ethylene or C4-C10 alpha olefins;
      wherein the random copolymer of propylene (A) has a lower MFR$_2$ and higher comonomer content than the random copolymer of propylene (B);
   (C) optional β-nucleating agent; and
   (E) optional further additives other than the optional β-nucleating agent (C);
   wherein the propylene copolymer composition has an MFR$_2$ of 0.15 to 0.30 g/10 min and a comonomer content of 2.8 to 9.9 mol %.

2. The propylene copolymer composition according to claim 1, wherein the propylene copolymer composition comprises a polypropylene composition (a) comprising a multimodal polypropylene (a) which comprises, based on the combined amount of the component (A) and the component (B),
   45 65 wt % of the random copolymer of propylene (A); and
   35 to 55 wt % of the random copolymer of propylene (B).

3. The propylene copolymer composition according to claim 1, wherein the propylene copolymer composition comprises a polypropylene composition (a) which comprises (C) β-nucleating agent.

4. The propylene copolymer composition according to claim 1, wherein:

the propylene copolymer composition has an amount of β-modification (B) of at least 0.6 when defined by the following formula:

$$B = \frac{I^\beta(300)}{I^\alpha(110) + I^\alpha(040) + I^\alpha(130) + I^\beta(300)}$$

wherein $I^\beta(300)$ is the intensity of β(300) peak, $I^\alpha(110)$ is the intensity of α(110) peak, $I^\alpha(040)$ is the intensity of α(040) peak and $I^\alpha(130)$ is the intensity of α(130) peak obtained after subtracting the amorphous halo.

5. The propylene copolymer composition according to claim 1, wherein the amount of β-nucleating agent product (C) is of from 0.0001 to 2.0 wt %, based on the amount of the propylene copolymer composition the ß-nucleating agents (C) selected from N,N'-dicyclohexyl-2,6-naphthalene dicarboxamide, 5,12-dihydro-quino(2,3-b)acridine-7,14-dione, quino(2,3-b)acridine-6,7,13,14(5H,12H)-tetrone, salts of dicarboxylic acids with at least 7 carbon atoms with metals of group II of the periodic table, and mixtures thereof.

6. The propylene copolymer composition according to claim 1, wherein the random copolymer of propylene (A) has an $MFR_2$ (ISO 1133, 2.16 kg load, 230° C.) of 0.02 to 0.1 g/10 min.

7. The propylene copolymer composition according to claim 1, wherein the random copolymer of propylene (B) has one or more, in any order of the following properties:
an $MFR_2$ (ISO 1133, 2.16 kg load, 230° C.) of 0.3 to 10 g/10 min, and/or
the comonomer content of 1.5 to 11 mol %.

8. The propylene copolymer composition according to claim 1, having one or more of the following properties:
comonomer content of 3.4 to 8.3 mol %, and/or
a Notched Charpy impact of >1 $kJ/m^2$ when measured at 0° C. according to ISO 179.

9. The propylene copolymer composition according to claim 1, wherein the comonomer of random copolymer of propylene (A) and the comonomer of random copolymer of propylene (B) is ethylene.

10. An article comprising the propylene composition according to claim 1.

11. The article according to claim 10 which is a pipe or pipe fitting.

12. The article according to claim 11, wherein the pipe is for pressure pipe applications.

* * * * *